United States Patent
Hurme

(10) Patent No.: US 6,473,611 B2
(45) Date of Patent: Oct. 29, 2002

(54) PREVENTING MISUSE OF CALL FORWARDING SERVICE

(75) Inventor: Jaana Hurme, Tampere (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/269,629

(22) PCT Filed: Oct. 7, 1997

(86) PCT No.: PCT/FI97/00609

§ 371 (c)(1),
(2), (4) Date: Mar. 30, 1999

(87) PCT Pub. No.: WO98/16052

PCT Pub. Date: Apr. 16, 1998

(65) Prior Publication Data

US 2001/0041557 A1 Nov. 15, 2001

(30) Foreign Application Priority Data

Oct. 10, 1996 (FI) .................................. 964067

(51) Int. Cl.⁷ ................................................ H04M 3/16
(52) U.S. Cl. ................... 455/410; 455/417; 455/435; 379/410.1; 379/411.1
(58) Field of Search ................... 455/417, 410, 455/411, 432, 433, 435, 445; 379/210, 211, 212, 213

(56) References Cited

U.S. PATENT DOCUMENTS

| | | | |
|---|---|---|---|
| 5,369,695 A | * 11/1994 | Chakravarti et al. | ........ 370/211 |
| 5,392,335 A | 2/1995 | Reeder | |
| 6,128,503 A | * 12/1997 | Granberg et al. | ............ 455/433 |
| 5,790,638 A | * 8/1998 | Bertacchi | ..................... 379/89 |
| 5,793,762 A | * 8/1998 | Penners et al. | ............. 455/461 |
| 5,862,490 A | * 1/1999 | Sasutaa et al. | .............. 455/525 |
| 5,901,359 A | * 5/1999 | Malmstrom | ................. 455/461 |
| 5,903,831 A | * 5/1999 | Foti | .......................... 455/410 |
| 5,920,820 A | * 7/1999 | Qureshi et al. | ............. 455/461 |

FOREIGN PATENT DOCUMENTS

| | | | |
|---|---|---|---|
| EP | 0 618 713 | 10/1994 | |
| WO | WO/94/29994 | 12/1994 | |
| WO | WO 96/15633 | 5/1996 | |
| WO | WO 96/20554 | 7/1996 | |
| WO | WO 96/31043 | * 10/1996 | ............ H04M/3/38 |

OTHER PUBLICATIONS

Mouly, et al., *The GSM System for Mobile Communications*, pp. 460–463.

A copy of the Search Report of PCT/FI97/00609.

* cited by examiner

*Primary Examiner*—Edward F. Urban
*Assistant Examiner*—Tilahun Gesesse
(74) *Attorney, Agent, or Firm*—Altera Law Group, LLC

(57) ABSTRACT

A method and an arrangement for detecting the misuse of the call forwarding service in a mobile communication system. In the invention, call forwarding is activated for routing a call addressed to a mobile subscriber to a forwarding number supplied by the mobile subscriber; the forwarding number is modified by registering call forwarding to another number; the number of call forwarding registrations is counted subscriber-specifically; and an alarm is generated when the number of call forwarding registrations exceeds a predetermined maximum value during a predetermined period of time.

4 Claims, 2 Drawing Sheets

PREVENTING MISUSE OF CALL FORWARDING SERVICE

FIELD OF THE INVENTION

Figure 1:
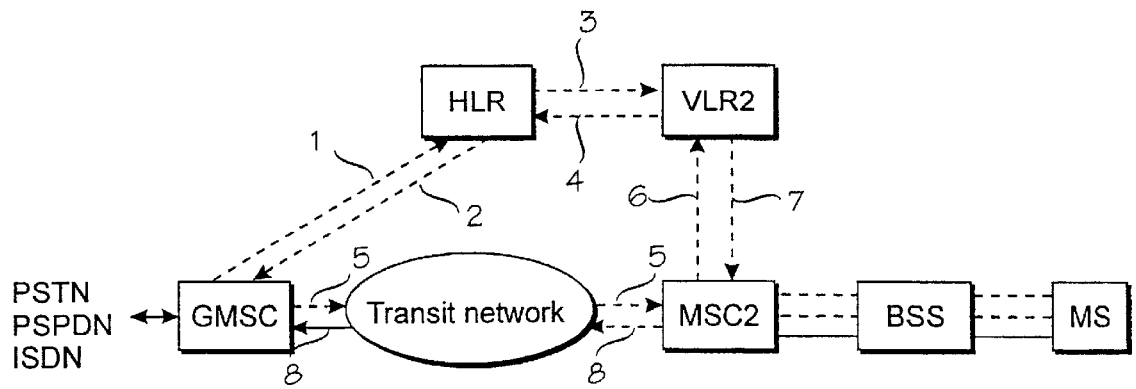

The invention relates of a method and an arrangement for detecting the misuse of the call forwarding service in a mobile communication system, the method comprising the steps of: activating call forwarding for routing a call addressed to a mobile subscriber to a forwarding number supplied by the mobile subscriber, and changing the forwarding number by registering call forwarding to another number.

BACKGROUND OF THE INVENTION

In addition to speech and data transmission, modern mobile communication systems provide subscribers with a plurality of supplementary facilities. During the last few years, the basic services defined by the standards have been taken into use, and the supply of more developed services based on the intelligent network architecture has continued to increase.

One of the most important supplementary facilities of mobile communication systems is call forwarding which a mobile subscriber can activate. Various call forwarding facilities may be chosen. In unconditional call forwarding, the mobile subscriber gives a call forwarding number to which a mobile terminating call is always forwarded. In conditional call forwarding, the mobile subscriber gives a number or numbers to which a mobile terminating call is forwarded if the mobile station is busy, disconnected from the network or when the mobile subscriber does not reply within a specified period of time. Call forwarding may also be defined service-specifically, whereby speech, data and facsimiles are each routed to a different number.

With services becoming more general, the operators have faced situations when services are misused, either for purposes of vandalism or for economic interest. It has been observed that even the call forwarding facility can be misused. In such cases a mobile subscriber offers to other parties the chance to make expensive call via his number, bills the callers himself, and fails to pay his own bills. Before an operator can reliably detect the misuse, the mobile subscriber may have caused significant damage.

BRIEF DESCRIPTION OF THE INVENTION

It is the object of the present invention to provide a means for detecting the above described misuse of the call forwarding facility as quickly as possible, and for implementing continuous control of call forwarding facilities.

This object is achieved with a method of the type described in the preamble, characterized in that the number of call forwarding registrations is counted subscriber-specifically, and an alarm is generated when the number of call forwarding registrations exceeds a predetermined maximum value during a predetermined period of time.

The invention is based on the idea that subscriber-specific counters counting the number of call forwarding registrations activated by a subscriber are arranged in the mobile communication system, preferably in a subscriber data base. If the number of call forwarding registrations rises remarkably high, it may be suspected that the mobile subscriber is misusing his subscriber line, and the operator is alerted. The operator is also provided with reports on the call forwarding functions of the subscribers at given intervals, for example in the order of the number of issued call forwarding registrations, whereby the operator quickly notices which users have to be observed regarding their payment behaviour.

The invention provides an efficient means for preventing intentional misuse of the call forwarding facility, and, in addition to maintaining continuous operation, for rapidly screening the cases where misuse may be suspected.

A LIST OF THE FIGURES

Figure 2:
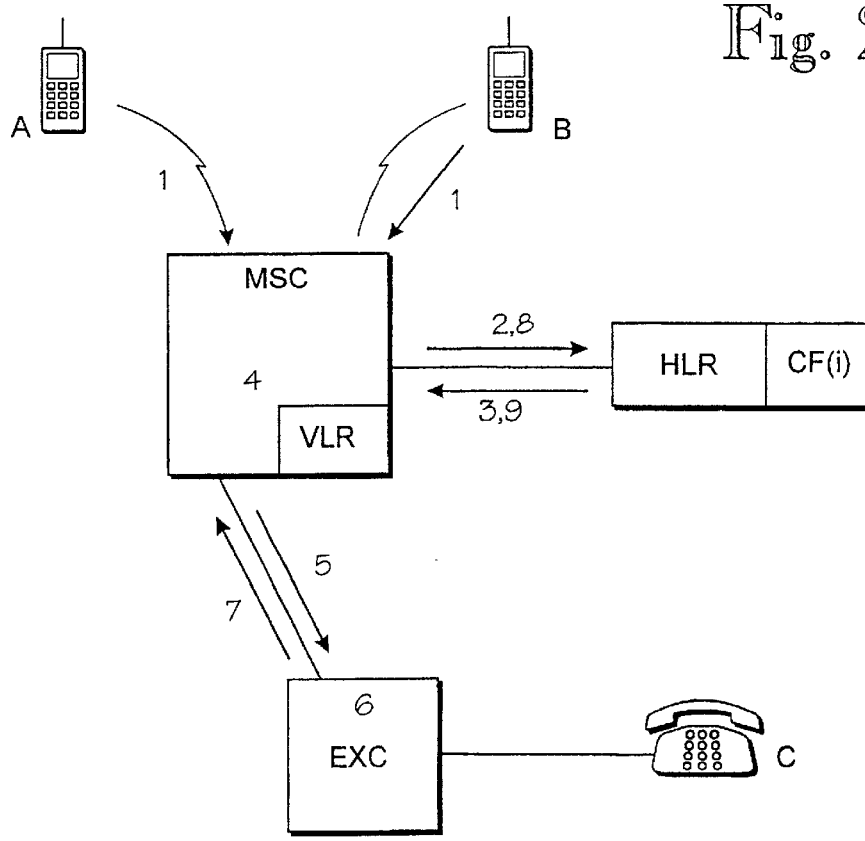
Figure 3:
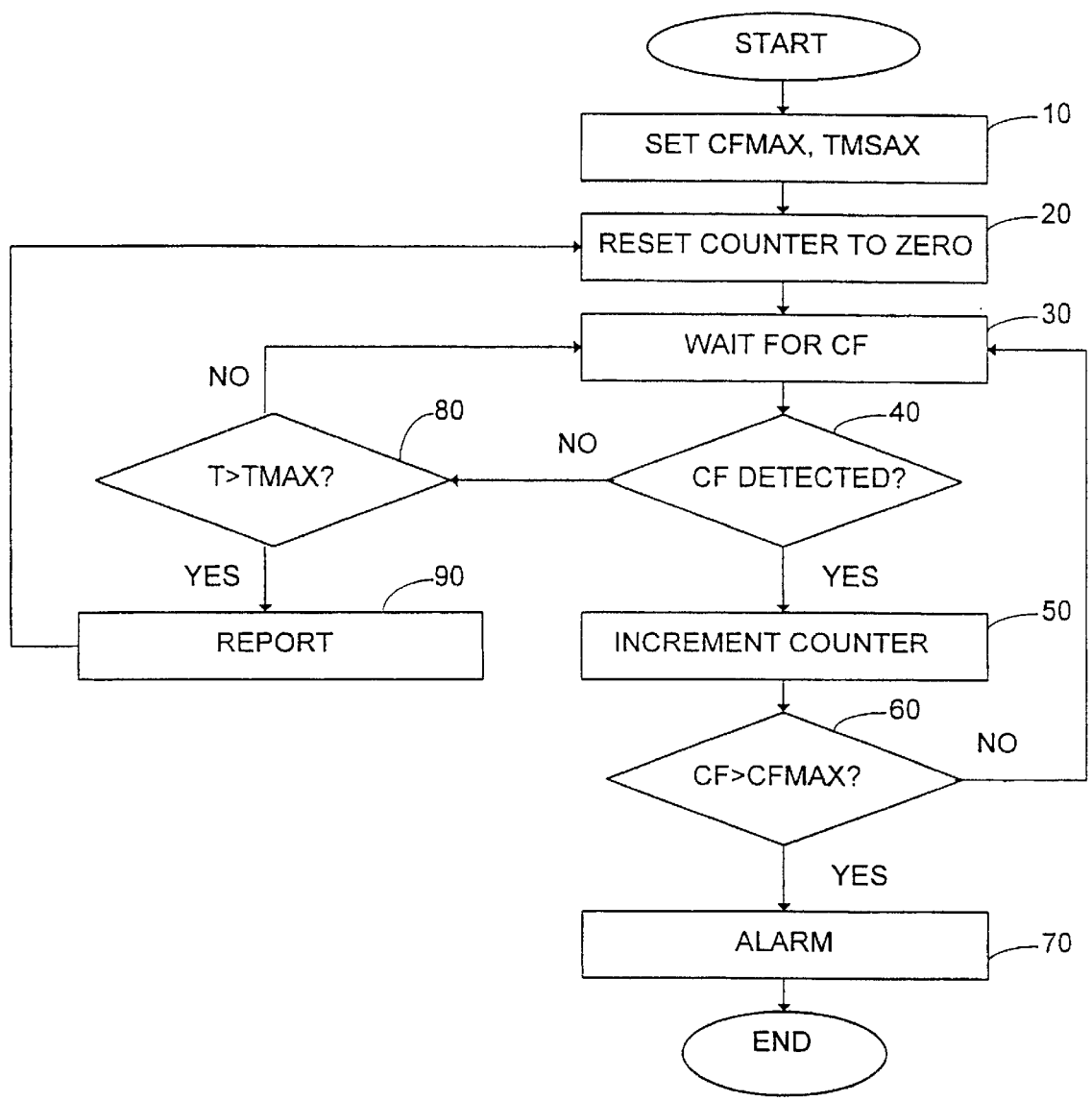

In the following the invention will be described in more detail with reference to the attached drawings, in which FIG. 1 is a block and signalling diagram illustrating the set-up of a mobile terminating call in the GSM mobile communication system, FIG. 2 is a block and signalling diagram illustrating a call set-up transaction according to the invention, FIG. 3 is a flow diagram illustrating the operation of the mobile station arrangement according to the invention.

The present invention may be applied to mobile communication systems providing call forwarding service, and particularly to systems where subscriber data is stored in subscriber data bases operationally separate from the mobile services switching centre. The present invention is particularly applicable to preventing the misuse of the call forwarding facility in the pan-European digital mobile communication system GSM (Global System for Mobile Communications) and in other similar mobile communication systems, such as the DCS1800 (Digital Communication System), the PCN (Personal Communication Network), and in mobile communication systems conforming with the EIA/ITIA INTERIM standard. In the following, the primary embodiment of the invention will be described implemented in the GSM system, without, however, restricting the invention thereto.

FIG. 1 shows briefly the basic structural parts of the GSM system, but without a more detailed description of their characteristics or other sub-areas of the system. As to a more detailed description of the GSM system, reference is made to the GSM recommendations and the publication "The GSM system for Mobile Communications", M. Mouly and M. Pautet, Palaiseau, France, 1992, ISBN: 2-9507190-0-0-7.

A mobile switching centre MSC attends to switching incoming and outgoing calls. It performs tasks similar to those carried out by a centre in the public telephone network (PSTN). In addition, it also performs operations typical of mobile telephone traffic only, such as e.g. subscriber location administration, in co-operation with the subscriber registers of the network. The subscriber registers in the GSM system are called a home location register HLR and a visitor location register VLR. The HLR stores permanently subscriber data and information on the VLR within whose area a MS is located. The visitor location register VLR again stores subscriber data of a mobile station MS temporarily during the time the mobile station is in the area of the mobile switching centre MSC associated with the visitor location register VLR. Typically, one VLR serves one mobile switching centre MSC. Mobile stations MS are connected to the centre MSC by means of base station systems BSS. The base station system BSS consists of base station controllers BSC and base stations BTS. One base station controller BSC is used for the control of several base stations BTS.

As stated above, mobile subscribers may define various call for-warding functions. Information on the call forwarding functions activated by a user is permanently stored in the subscriber's home location register HLR. In addition, information on at least activated conditional call forwarding is supplied to and stored in the visitor location register VLR serving the subscriber.

In order to facilitate comprehending the invention, the set-up of a mobile station MS terminating call, and the implementation of unconditional and conditional call forwarding in the GSM system will be described in the following with reference to FIG. 1. It is assumed that the call comes from the public telephone network PSTN to the gateway centre GMSC of the mobile communication network, the centre making a routing information inquiry 1 to the home location register HLR of the subscriber, the HLR being determined according to the subscriber's subscriber number MSISDN. The subscriber's MSISDN number is also sent in the routing information inquiry 1. In connection with location updating, information on the visitor location register VLR2 within whose area the mobile subscriber is located is updated in the home location register HLR. The HLR checks if the called subscriber has activated unconditional call forwarding or if the subscriber is disconnected from the network, and if the subscriber has activated call forwarding for such a situation. If this is the case, the HLR notifies the gateway centre GMSC of active call forwarding and supplies the forwarding number in a reply message 2. The GMSC then forwards the call on the basis of the forwarding number.

Should the HLR discover that call forwarding has not been activated, it makes a roaming number request 3 to the visitor location register VLR2. In connection with location updating, information on the visitor location register VLR within whose area the mobile subscriber is located is updated in the home location register HLR. The VLR2 reserves a roaming number MSRN and sends the reserved roaming number to the home location register HLR in a reply message 4. The HLR in turn forwards the roaming number to the centre GMSC who inquired about the routing information in message 2. The roaming number space has been defined such that a call is always directed to the centre MSC whose visitor location register VLR2 reserved the reservation number. This way the gateway centre GMSC can route the call forward on the basis of the roaming number by sending an initial address message 5 to the mobile services switching centre MSC2 indicated by the roaming number.

Having received the initial address message 5, the centre MSC2 discovers in a roaming number analysis that the call is being terminated within its own area, and there is no intention to route the call forward. In this case the MSC2 then inquires of its own visitor location register VLR2 about information on the called subscriber for call set-up, message 6. Normally, the visitor location register VLR2 returns the relevant information in a reply message 7, and the call is set up via the base station system BSS to the mobile station MS. If the subscriber is busy, if the subscriber is located within a shadow area, or if the subscriber does not reply to the call, the MSC2 detects the state of the subscriber and informs it to the VLR2, whereby the VLR2 checks if call forwarding is active, and if call forwarding is active, the VLR2 returns the forwarding number to the MSC2. The MSC2 then routes the call forward on the basis of the forwarding number (8).

In the billing of call forwarding, the same principle is generally applied as in connection with roaming, i.e. the maximum price paid by the calling subscriber A for his call is the price he would incur in a normal call to the forwarding number. The extra cost caused by forwarding is debited from the subscriber who activated forwarding.

In the following, the misuse of the call forwarding facility, and the arrangement according to the invention will be studied at network level with reference to FIG. 2. In FIG. 2 it is assumed that the MSC is simultaneously both the mobile services switching centre serving mobile subscribers A and B and the gateway centre GMSC of the mobile communication network to the public telephone network PSTN. In the example of FIG. 2, caller A is a mobile subscriber, and the target of call forwarding, subscriber C, operates in the public telephone network. In practice, subscribers A and C may operate under the control of any network that is able to set up a connection with a mobile services switching centre.

Let us assume that mobile subscriber B informs unofficially that he is able to forward calls to expensive service number or abroad, for example, at a cost lower than the real price of the call. Mobile subscriber A sets up a connection with mobile subscriber B and gives the latter a PSTN subscriber's number C to which he wants to make a call. At his own mobile station, mobile subscriber B activates unconditional call forwarding to the PSTN subscriber's C-number. Mobile subscriber A is billed for the call at the normal price of a call between two mobile telephones, and the part caused by call forwarding, particularly the cost resulting from the use of the service number, is directed to mobile subscriber B.

Mobile subscriber B may operate as described above only as long as the disturbances in billing make the operator observe the operation of the subscriber. However, the damage done during this time may become unnecessarily great. The same situation arises when mobile subscriber B utilizes a stolen telephone, for example, whose subscriber-specific password is activated when the card is lost or stolen. Until the subscriber line is closed, the mobile station may be utilized without the other callers (subscribers A) participating in the misuse having to gain access to the actual mobile station. The present invention provides a means for quick and reliable detection of the above described misuse.

In a first embodiment of the invention, the operator determines in the home location register HLR an appropriate follow-up period and a maximum value for the number of call forwarding registrations within the follow-up period. The home location register HLR is provided with a subscriber-specific counter CF(i) counting the number of the call forwarding registrations activated by the subscriber. If the reading of the counter exceeds the maximum value CFMAX given by the operator, the systems alerts the operator. The operator may then place the mobile subscriber under stricter control and, if necessary, interfere in the use of the subscriber line.

FIG. 3 shows an operational flow diagram illustrating the operation of the arrangement according to the invention. At point 10 the operator determines the length TMAX of the follow-up period and determines the value CFMAX for the counters CF(i), the value being the number of call forwarding registrations the exceeding of which results in suspicion of misuse of the call forwarding facility.

At point 20 the system resets the counters CF(i) to zero and starts to wait for call forwarding registrations (point 30). When the system receives a new call forwarding registration (point 40) from the subscriber, the value of the subscriber's counter CF(i) is incremented by one (point 50). The system checks if the number of the subscriber's call forwarding registrations exceeds the upper limit CFMAX (point 60) given by the operator. If not, in accordance with point 30, the system starts to wait for the next call forwarding registration. If the number CF(i) of the subscriber's call forwarding registrations exceeds the upper limit CFMAX given by the operator, the system alerts the operator.

In order for the arrangement according to the invention to operate appropriately, the operator has to be able to determine suitable limits for the period of observation and the maximum value of call forwarding registrations. Too large a number of alarms leads to too large a group being monitored, and too wide limits may leave potential problematic cases outside observation. A report given at given intervals, preferably at intervals of the length of the follow-up period, on subscribers in the order of the number of call forwarding registrations, for example, supports the implementation of the solution according to the invention.

The system follows the call forwarding registrations during the follow-up period determined by the operator. When the follow-up period is exceeded (point 80), the system generates a report on the numbers of subscriber-specific call forwarding registrations (point 90).

The widest alternative is to monitor the call forwarding registrations of all network subscribers. In some cases, however, it is more practical for the operator to subject only some network subscribers to the monitoring of call forwarding registrations.

The Figures and the related description are only intended to illustrate the present invention. In its details the method and arrangement according to the invention may vary within the scope of the claims. Although the invention has been described above mainly by means of the GSM system, the method and arrangement may be used in connection with other similar mobile communication systems.

What is claimed is:

1. A method for detecting the misuse of the call forwarding service in a mobile communication system, the call forwarding service comprising:

activating call forwarding for routing a call addressed to a mobile subscriber to a forwarding number supplied by the mobile subscriber, changing the forwarding number by registering call forwarding to another number, providing a subscriber database with counters for counting a number of call forwarding registrations subscriber-specifically, counting the number of call forwarding registrations subscriber-specifically in said subscriber database by using said counters, generating a report on the number of subscriber-specific call forwarding registrations at predefined intervals, and generating an alarm when the number of call forwarding registrations counted for a subscriber in said subscriber database exceeds a predetermined maximum value during a predetermined period of time.

2. A method as claimed in claim 1, comprising counting the number of call forwarding registrations of only part of the subscribers.

3. An arrangement for detecting the misuse of the call forwarding service in a mobile communication system comprising:

mobile stations, mobile services switching centres, and subscriber data bases, wherein the mobile services switching centres and the subscriber data bases are supplied with means for implementing call forwarding on the basis of call forwarding registered by a mobile station, at least one subscriber data base is provided with counters for subscriber-specifically counting the number of times a mobile station has registered a call forwarding, means for generating a report on the number of subscriber-specific call forwarding registrations at predetermined intervals, and an alarm arrangement for generating an alarm when the number of call forwarding registrations counted by one of said counters during a predetermined period of time exceeds a predetermined maximum value.

4. An arrangement as claimed in claim 3, wherein the arrangement comprises means for subjecting only part of the subscribers to the counting of call forwarding registrations.

* * * * *